United States Patent
Hottinen et al.

(10) Patent No.: US 6,584,302 B1
(45) Date of Patent: Jun. 24, 2003

(54) METHOD AND ARRANGEMENT FOR FORMING A BEAM

(75) Inventors: Ari Hottinen, Espoo (FI); Risto Wichman, Helsinki (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/419,854

(22) Filed: Oct. 19, 1999

(51) Int. Cl.[7] .............................. H04B 7/14; H04B 7/26; H04Q 7/30
(52) U.S. Cl. .................. 455/69; 455/562; 370/275; 370/280
(58) Field of Search ................... 370/275, 280; 455/69, 562

(56) References Cited

U.S. PATENT DOCUMENTS 5,274,844 A * 12/1993 Harrison et al. ............. 342/368
6,108,323 A *  8/2000 Gray ........................... 370/335
6,212,406 B1 *  4/2001 Keskitalo et al. ......... 455/277.1

FOREIGN PATENT DOCUMENTS

WO         98/27669        6/1998

OTHER PUBLICATIONS

"Space–Time Block Coding for Wireless Communications: Theory of Generalized Orthogonal Designs" Tarokh, et al., IEEE Transactions on Information Theory. (Submitted 1998).

* cited by examiner

*Primary Examiner*—Daniel Hunter
*Assistant Examiner*—Alan T. Gantt
(74) *Attorney, Agent, or Firm*—Squire Sanders & Dempsey LLP

(57) ABSTRACT

The invention relates to a method and an arrangement for forming a beam for transmission in a TDD communication system, wherein an antenna comprises several elements. A multipath propagated signal is received and an antenna response is estimated. A subset of the responses is selected and beam forming coefficients are calculated by using the selected subset. The signal to be transmitted is multiplied by the beam forming coefficients. The inventive solution can be used in a call set-up.

50 Claims, 4 Drawing Sheets

METHOD AND ARRANGEMENT FOR FORMING A BEAM

BACKGROUND OF THE INVENTION

The invention relates to wireless communication systems in general, and more particularly to TDD communication using an antenna with more than one antenna element.

In CDMA (Code Division Multiple Access) a user's narrowband data signal is modulated to a relatively wide band by means of a spreading code of a broader band than the data signal. Prior art CDMA systems utilize bandwidths of more than 1 MHz. In a WCDMA (Wide-band CDMA) radio system bandwidth is considerably broader still because current mobile networks wish to provide users with increasingly diversified services.

In the CDMA radio system a spreading code usually comprises a long pseudo-random bit sequence. The bit rate in the spreading code is much higher than in a data signal and to distinct spreading code bits from data bits and data symbols, they are called chips. Each data symbol of a user is multiplied by the spreading code chips, thereby spreading the narrowband data signal to the frequency used by the spreading code. Each user- has a specific spreading code, and it may be one or more data bits long. A plurality of users transmit simultaneously at the same frequency, and the data signals are separated in the receivers on the basis of the pseudo-random spreading code.

Data transmission in radio systems takes place in duplex mode which can be implemented by applying a FDD (Frequency Division Duplex) or a TDD (Time Division Duplex) principle. In the FDD solution reception and transmission are carried out at different frequencies. In the TDD solution reception and transmission are carried out at different instants of time, but the frequencies of the received signal and the transmitted one are the same.

At a base station of the SDMA (Spatial Division Multiple Access) radio system using the CDMA TDD technique in particular, a signal is received and transmitted through an antenna group comprising several antenna elements. Each antenna element is typically connected to one transceiver. Signals transmitted and received in a common baseband unit are phased in relation to each other to provide a radiation pattern of a desired form with the antenna group. A typical antenna pattern comprises a narrow main beam and a plurality of side beams. The direction and width of the main beam can be controlled by phasing the radio frequency signal[ ]of each element. In practice the phasing is carried out by multiplying the digitised baseband antenna signal of each antenna element by complex coefficients shaping the antenna pattern. This solution is described in greater detail in WO 98/27669, included herein as a reference. According to the solution disclosed in WO 98/27669 the response of the antenna and hence the beam forming coefficients result in a matrix in a situation where the signals experience multipath propagation. To use the matrix in transmission leads to many problems such as: complicated receiver structure, unnecessarily heavy loss of orthogonality of the multipath signals due to a large number of paths, and extensive path losses.

SUMMARY OF THE INVENTION

An object of the invention is therefore to provide a method and an equipment implementing the method so as to allow the above problems to be solved. The invention relates to a method for forming a beam of a signal to be transmitted from at least one transceiver in a TDD communication system, the method comprising: receiving and transmitting a signal by using an antenna comprising at least two elements; receiving a multipath propagated signal from at least one different transceiver and estimating responses of the antenna at different delays for each different transceiver; selecting a subset of at least one response of the antenna for at least one different transceiver at such a delay or delays that the selected at least one response of the antenna has a local energy maximum; calculating beam forming coefficients for each different transceiver by using the selected subset; and multiplying the signal to be transmitted by the beam forming coefficients for each antenna element.

The invention also relates to a method for forming a beam of a signal to be transmitted from at least one transceiver in a TDD communication system, the method comprising: a base station receiving and transmitting by using an antenna comprising at least two elements; the base station calculating an estimate of received interference power; the base station transmitting a signal comprising information on the transmit power and the interference power at the base station; a subscriber equipment receiving the signal, forming a channel estimate and calculating the power of a signal to be transmitted to the base station on the basis of the information in the received signal and the channel estimate of the received signal; the subscriber equipment transmitting to the base station by using the estimated transmit power; the base station receiving the signal transmitted by the subscriber equipment and the base station calculating beam forming coefficients for each antenna element on the basis of the received signal by estimating responses of the antenna of the received signal at different delays; selecting a subset of at least one response of the antenna at such a delay or delays that the selected at least one response of the antenna has a local energy maximum; calculating the beam forming coefficients by using the selected subset; and multiplying the signal to be transmitted by the beam forming coefficients for each antenna element.

The invention further relates to a method for forming a beam of a signal to be transmitted from at least one transceiver in a TDD communication system in conjunction with a call set-up, the method comprising: a base station receiving and transmitting by using an antenna comprising at least two elements; the base station calculating an estimate of received interference power; the base station transmitting a common downlink signal comprising information on the transmit power and the interference power at the base station; a subscriber equipment receiving the common downlink signal, forming a channel estimate and calculating the power of an access signal to be transmitted to the base station on the basis of the information in the received common downlink signal and the channel estimate of the received common downlink signal; the subscriber equipment transmitting the access signal to the base station by using the estimated transmit power; the base station receiving the access signal transmitted by the subscriber equipment and the base station calculates beam forming coefficients for each antenna element on the basis of the received access signal by estimating responses of the antenna at different delays for the subscriber equipment; selecting a subset of at least one response of the antenna at such a delay or delays that the selected at least one response of the antenna has a local energy maximum; calculating the beam forming coefficients for each different transceiver by using the selected subset; and multiplying the signal to be transmitted by the beam forming coefficients.

The invention additionally relates to an arrangement for forming a beam of a signal to be transmitted from at least one transceiver in a TDD communication system that comprises at least one base station and at least one subscriber equipment which are transceivers, a transceiver comprising an antenna with at least two elements for receiving and transmitting a signal; the transceiver being arranged to receive a multipath propagated signal from at least one different transceiver and to estimate responses of the antenna at different delays for each different transceiver; the transceiver being arranged to select a subset of at least one response of the antenna for at least one different transceiver at such a delay or delays that the selected at least one response of the antenna has a local energy maximum; the transceiver being arranged to calculate beam forming coefficients for each different transceiver by using the selected subset; and the transceiver being arranged to multiply the signal to be transmitted by the beam forming coefficients for each antenna element.

The invention further relates to an arrangement for forming a beam of a signal to be transmitted from at least one transceiver in a TDD communication system that comprises at least one base station and at least one subscriber equipment which are transceivers, a base station comprising an antenna with at least two elements for receiving and transmitting signals; the base station being arranged to calculate an estimate of received interference power; the base station being arranged to transmit a signal comprising information on the transmit power and the interference power at the base station; a subscriber equipment being arranged to receive the signal, to form a channel estimate and to calculate the power of a signal to be transmitted to the base station on the basis of the information in the received signal and the channel estimate of the received signal; the subscriber equipment being arranged to transmit to the base station by using the estimated transmit power; the base station being arranged to receive the signal transmitted by the subscriber equipment and the base station being arranged to calculate beam forming coefficients for each antenna element on the basis of the received signal so that the base station is arranged to estimate responses of the antenna of the received signal at different delays; the base station is arranged to select a subset of at least one response of the antenna at such a delay or delays that the selected at least one response of the antenna has a local energy maximum; the base station is arranged to calculate the beam forming coefficients by using the selected subset; and the base station is arranged to multiply the signal to be transmitted by the beam forming coefficients for each antenna element.

The invention further relates to an arrangement for forming a beam of a signal to be transmitted from at least on transceiver during a call set-up in a TDD communication system that comprises at least one base station and at least one subscriber equipment which are transceivers, a base station comprising an antenna with at least two elements for receiving and transmitting; the base station being arranged to calculate an estimate of received interference power; the base station being arranged to transmit a common downlink signal comprising information on the transmit power and the interference power at the base station; a subscriber equipment being arranged to receive the common downlink signal, to form a channel estimate and to calculate the power of an access signal to be transmitted to the base station on the basis of the information in the received common downlink signal and the channel estimate of the received common downlink signal; the subscriber equipment being arranged to transmit the access signal to the base station by using the estimated transmit power; the base station being arranged to receive the access signal transmitted by the subscriber equipment and the base station being arranged to calculate beam forming coefficients for each antenna element on the basis of the received access signal so that the base station is arranged to estimate responses of the antenna of the received signal at different delays; the base station is arranged to select a subset of at least one response of the antenna at such a delay or delays that the selected at least one response of the antenna has a local energy maximum; the base station is arranged to calculate the beam forming coefficients by using the selected subset; and the base station is arranged to multiply the signal to be transmitted by the beam forming coefficients for each antenna element.

Several advantages are gained by the method and arrangement of the invention. The operation of the subscriber equipment can be simplified. As the number of paths can be restricted during transmission, the structure of the receiver can be made simpler, which usually means fewer correlators. Also the orthogonality of the multipath components can be better maintained because the number of paths is limited. The beam or the beams of the transmitter can be made to depend on the multipath propagation of the signal and/or the structure of the receiver, and path losses can be reduced.

BRIEF DESCRIPTION OF THE DRAWINGS

The invention is now described in more detail in connection with preferred embodiments with reference to the attached drawings, in which.

DETAILED DESCRIPTION OF PREFERRED EMBODIMENTS

In the following, a method and equipment using the TDD (Time Division Duplex) radio system, where both uplink and downlink transmissions are at the same frequency, but separated from each other in different time slots, will be described in greater detail. The invention can be utilized in a CDMA radio system not restricting the description thereto, however, since the invention is also applicable in connection with other multiple access methods, as will be evident for a person skilled in the art on the basis of the description below.

In a TDD system communication between a base station and a subscriber station, which is usually a mobile telephone, takes place in frames. The total length of a frame can be for example $t_F=10$ ms. A frame comprises for instance time slots each of which is divided into two parts of the same size for transmissions in uplink and downlink, respectively.

Figure 1:
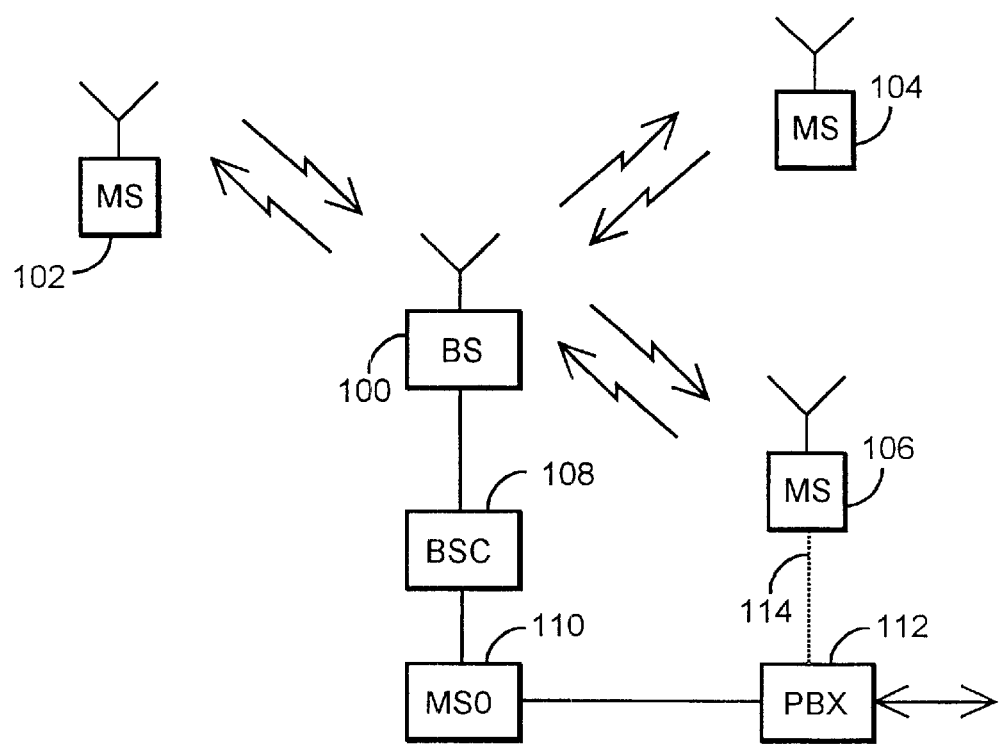
FIG. 1 shows a block diagram of a mobile telephone system.

A structure of a mobile communication system is depicted in FIG. 1. The mobile communication system comprises at least a base station 100, and subscriber equipment 102–106 that communicate bi-directionally with the base station 100. In a TDD system the base station 100 and the subscriber equipment 102 transmit at the same frequency as, but the transmissions take place in different time slots. The base station 100 is connected to a base station controller 108 that controls at least one base station. The base station controller 108 is further connected to a mobile telephone switching office 110 that connects the subscriber equipment 102–106 to other mobile systems and/or a public switched network through a public switched exchange 112. In the preferred embodiment of the invention the base station 100 can transmit information on the signal transmitted over the radio interface and/or on the complexity of the base station's receiver to the subscriber equipment 106 through radio interface. The subscriber equipment 106 can also send information on the signal transmitted over the radio interface and/or on the complexity of subscriber equipment's receiver to the base station 100. The complexity of the receiver means for example the number of the rake fingers. The information on the signal can comprise for example: power of the received signal, a desired transmit power of the base station 100 or the subscriber equipment 106, a desired transmit power of the base station 100 or the subscriber equipment 106 in relation to a known signal, or a desired transmit power to one or more beams. A known signal can be for example a pilot signal. Typically a subscriber equipment 106 is not directly connected to a public switched network.

However, a direct connection from the subscriber equipment 106 to the public switched exchange 112 is possible; the wired connection is depicted with a dashed line in the FIG. 1. In the advantageous embodiment of the invention the base station 100 can send information on the signal transmitted over the radio interface and/or on the complexity of its receiver to the subscriber equipment 106 through the base station controller 108, mobile telephone switching office 110, public switched exchange 112 and the wire 114. The subscriber equipment 106 can also send information on the signal transmitted over the radio interface and/or the complexity of subscriber equipment's receiver to the base station 100.

Figure 2A:
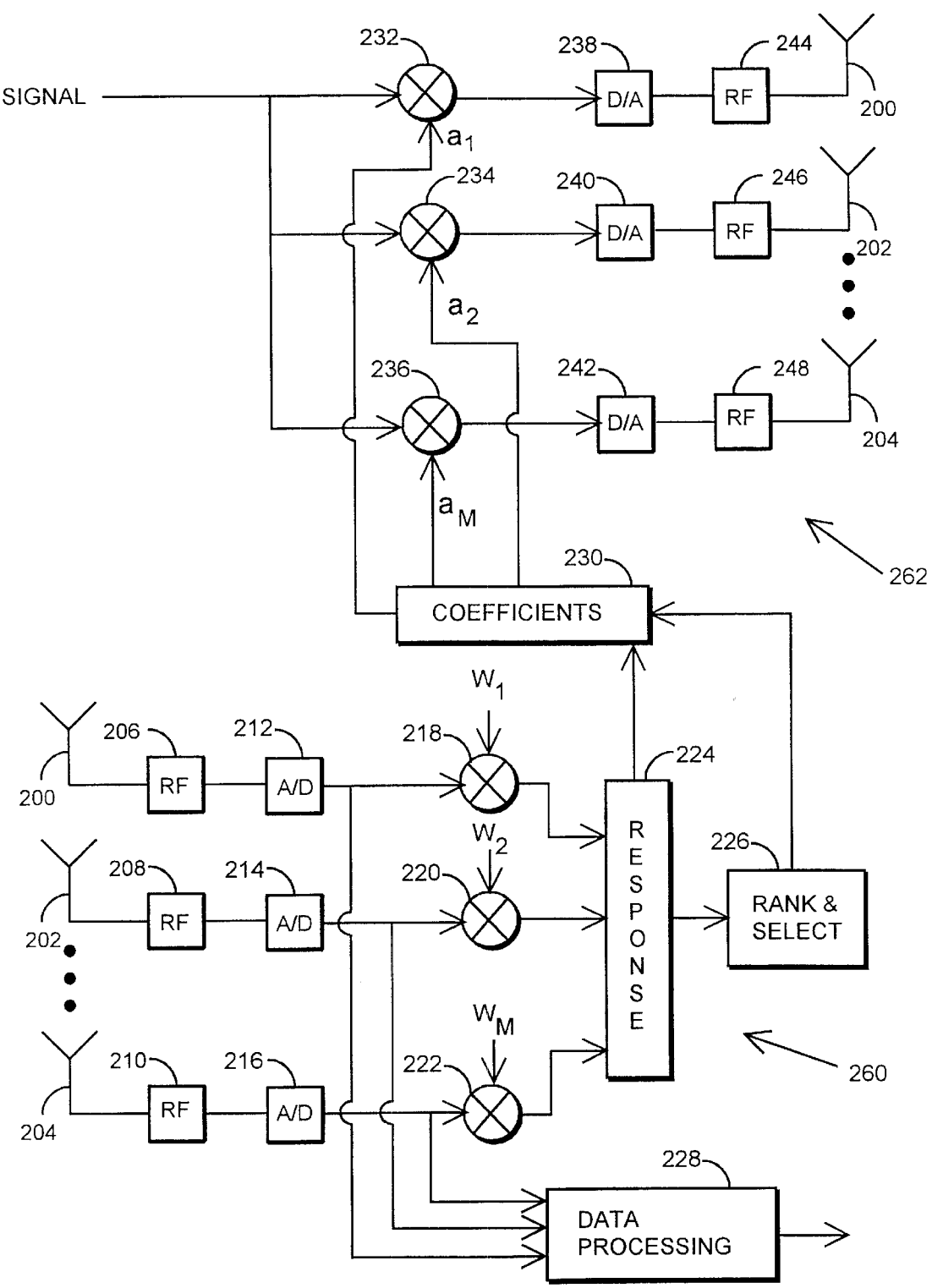
FIG. 2A shows a block diagram of a transceiver.

FIG. 2A presents a transceiver that has a group of antenna elements 200–204 for transmitting and receiving. The transceiver is usually a base station but it can also be a subscriber equipment. The antenna with several elements can be an antenna array or some other kind of cluster of antenna elements. Let us first have a closer look at the receiver 260. Each signal received from each antenna 200–204 enters RF-means 206–210 that convert the radio frequency signal to baseband signals in a known manner. The signals are digitised in A/D-converters 212–216. The digital baseband signals are multiplied by coefficients $W_1-W_M$ that form the shape of the beam of the antenna in multipliers 218–222. The coefficients $W_1-W_M$ are digital complex numbers. The receiver searches for the values of the coefficients $W_1-W_M$ that produce the best reception. Antenna responses are calculated in an antenna response unit 224 for each antenna element. The antenna responses are ranked and a subset of the set of the antenna responses is selected in rank and select unit 226.

A response of an antenna element is similar to an impulse response and is calculated by using correlation. In the correlation a known pseudo-random spreading code is correlated with the received signal L times. L is the number of paths of the multipath propagated signal. After calculating one correlation value the spreading code is shifted by time difference $\Delta T$ which can be the same as the duration of a chip. In a mathematical form the correlation $C(\tau)$ can be expressed in a general form as:

$$C(t) = \int_a^b x(\tau) y(t-\tau) d\tau, \quad (1)$$

where a and b represent the starting point and the finishing point of the calculation. A digital correlation matrix or a vector C is calculated for the vectors X and Y as follows:

$$C(n) = \sum_{i=0}^{L-1} x(i) y(n-i), \quad (2)$$

where C(n) represents an element of the matrix C. C(n) is similar to C(t), where t is $t = i \cdot \Delta T$.

In the transmitter 262 the subset comprising at least one antenna response is fed to a coefficient unit 230 that calculates the coefficients $a_1-a_M$ for each antenna element 200–204 transmitting a signal. The signal to be transmitted is multiplied by the coefficients using the multipliers 232–236. The signal weighted by the coefficients $a_1-a_M$ is then converted to an analog signal by D/A-converters 238–242. After that the analog signals are converted to radio frequency signals in RF-means 244–248 and the radio frequency signals are transmitted by the antenna elements 200–204.

Figure 2B:
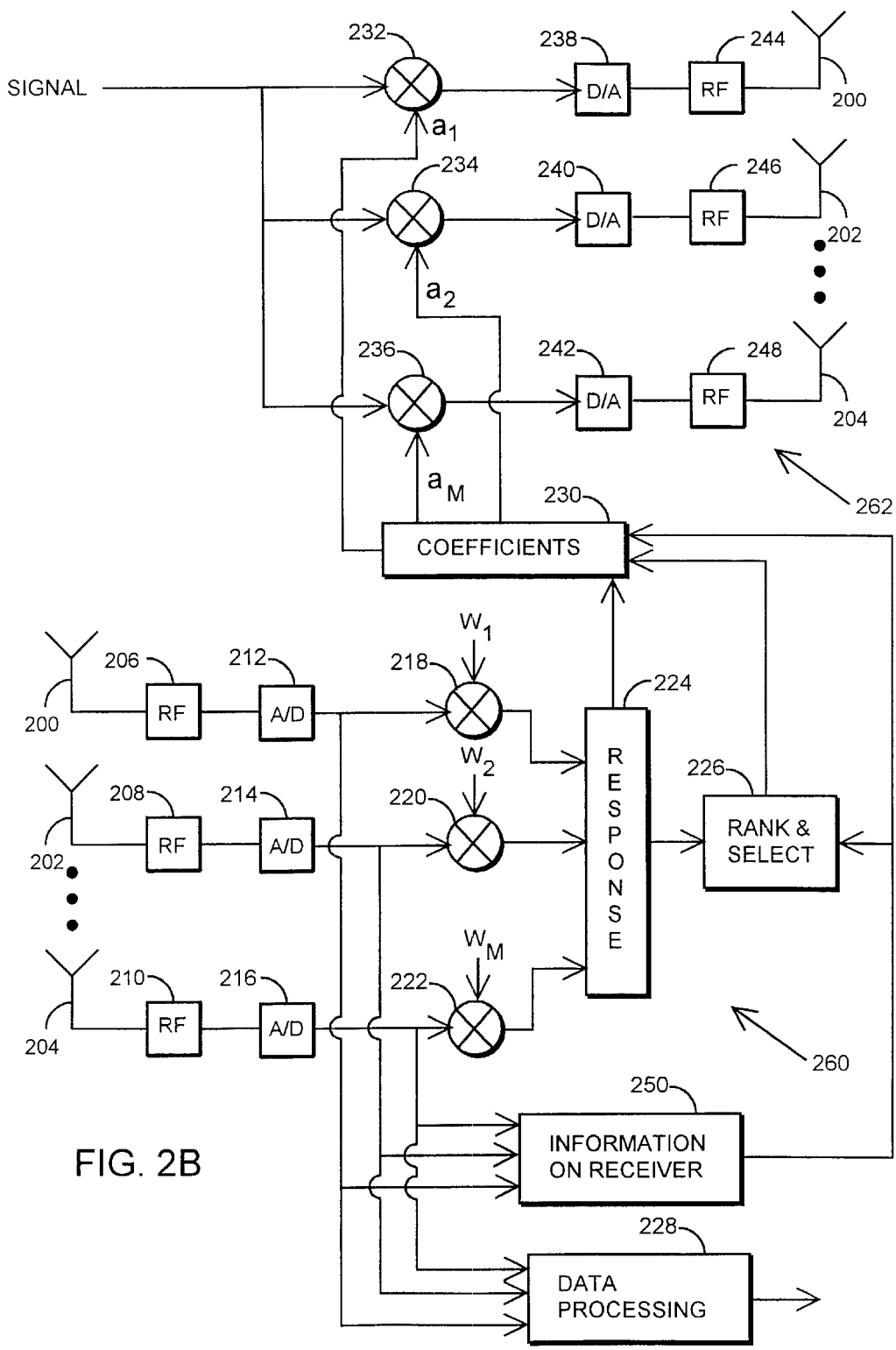
FIG. 2B shows a block diagram of a transceiver.

FIG. 2B presents another embodiment of the invention. The transceiver is otherwise similar to the transceiver in FIG. 2A, but this solution comprises a unit 250 that receives and detects information on the receiver. If for example a subscriber equipment transmits a signal comprising information on the complexity of the receiver, the base station detects the information by using unit 250 and utilizes the information in forming the coefficients $a_1-a_M$ for transmission. If the subscriber equipment can detect only one path of the multipath propagated signal, the base station transmits by using such coefficients that a beam (or beams) has (have) essentially only one delay at the receiver of the mobile station.

The complexity of the receiver depends for example on the fingers of the rake receiver. Especially in a CDMA radio system rake fingers are used in order to utilize the time diversity resulting from multipath propagation of signals. A rake receiver comprises at least one rake finger. Each finger is an independent receiver unit that despreads and demodulates the received signal. Each rake finger is usually synchronized to one signal component of a multipath propagated signal. A searcher finger searches for the most important paths by using impulse response measurements and each rake finger starts to despread a signal component by using a matched filter based on the delay profile measured by the searcher finger. The despread and demodulated signals are typically combined in order to improve the signal quality.

The complexity of the receiver varies for example along with the data rate according to the formula D·L=F, where D is the data rate, L is the number of paths the receiver can detect and F is a constant. The number of paths the receiver can detect depends on the number of the correlators the receiver comprises. If the data rate can be increased in the mobile telephone system, it means that the receiver can detect less paths. If the receiver can detect less paths it is no use to transmit signals to those paths. The number of paths can be eliminated in transmission by selecting the coefficients $a_1-a_M$ forming the antenna beam so that the delay spread is minimized at the receiver. If the transmission is to remain synchronous in order to guarantee orthogonality between users, a proper selection of the beam forming coefficients is necessary.

Figure 3C:
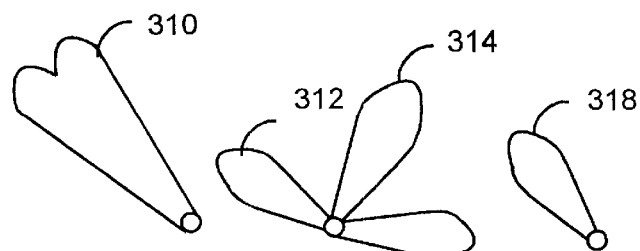
FIG. 3C shows beams of an antenna element.
Figure 3A:
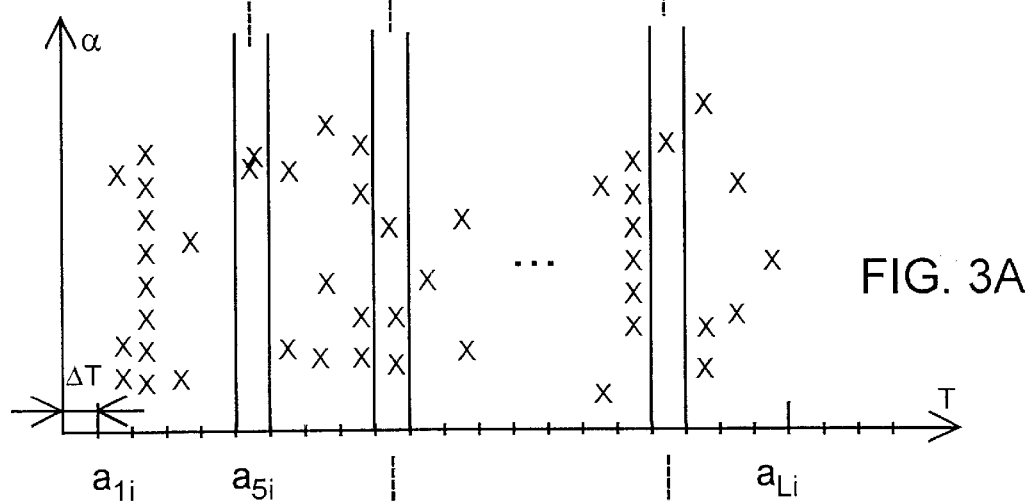
FIG. 3A shows a response of an antenna element.

In FIG. 3A a response of an antenna element i is depicted. The vertical axis is an angle α of arrival of a signal to an antenna element of a receiver. The horizontal axis is time T. The resolution in time is ΔT and the correlation is calculated from $T_0$ to $T_L$. Crosses in FIG. 3A represent local maximum values of the received signal, and the local maximum values represent signal components caused by multipath propagation of the signal. As the example in FIG. 3A shows, the different signal components arrive not only at different times but also from different directions. It can thus be said that the signal scatters not only in the time domain but also in the angular domain, which can be described by the angle of arrival of the signal. The angle of arrival is not of interest, however, in the embodiment of the invention. That is why the powers or strengths in the peaks from the different angles at certain difference of time ΔT are summed together and they form values $a_{1i}-a_{Li}$, where the number of paths is from 1 to L. The correlation values $a_{1i}-a_{Li}$ are calculated according to the formula (2).

Figure 3B:
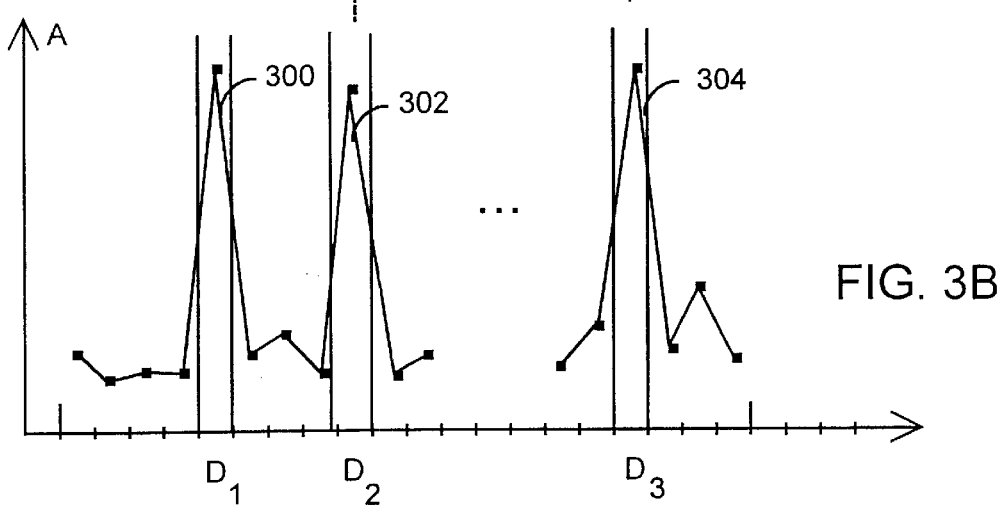
FIG. 3B shows a response of an antenna element.

In FIG. 3B an impulse response of an antenna element is shown. The vertical axis is the strength A of the signal which is the same as the amplitude of the correlation. The horizontal axis is time T. FIG. 3A and FIG. 3B show the same results. There are three strong paths at delays $D_1$, $D_2$ and $D_3$ with peaks 300, 302 and 304. According to the inventive method at least one of these strongest values 300, 302 and 304 is selected to be used for calculating the beam forming coefficients.

FIG. 3C shows the forms of the beam of an antenna element at delays $D_1$, $D_2$ and $D_3$. At the instant of time $D_1$ there are only two directions from which the signal is coming and both directions are nearly the same. That is why there is only a beam 310 that is slightly doubled for transmission. At the instant of time $D_2$ there are three clearly separate directions from which the signal is coming, but they still produce a strong signal peak 302. They produce three separate peaks 312–316 for transmission, too. At the instant of time $D_3$ there is only one signal coming, probably because of line of sight between the base station and the subscriber equipment. That is why there is only one beam 318 of antenna. If the response of the antenna 318 is selected, the response of the antenna has the value $W_i$ where i is the antenna element. For the transmission the complex conjugate $W_i^*$ of the value $W_i$ is formed. The complex conjugate $W_i^*$ can directly serve as a beam forming coefficient $a_i$ for transmission. The complex conjugates $W_i^*$ can also be scaled or weighted in order to provide an optimal beam form for the transmission from the transmitter to the receiver.

Coefficients of an antenna comprising multiple elements is typically modelled as a M-dimensional complex vector $a_p = c_p[a_1 \ldots a_M]^T$ for a certain path p, where each $a_1 \ldots a_M$ is a weighted or a non-weighted complex conjugate of $W_i$. When all elements of the antenna and all desired delays are taken into account, a matrix of coefficients based on the response of the antenna can be formed:

$$\begin{bmatrix} a_{11} & \cdots & a_{1M} \\ \vdots & & \vdots \\ a_{LI} & \cdots & a_{LM} \end{bmatrix}$$

where element $a_{ij}$ represents the correlation value of the $i^{th}$ delay or path and the $j^{th}$ antenna element, L is the number of the paths and M is the number of the antenna elements. All these coefficients of the matrix can be used in transmission, but their use involves a lot of drawbacks. The structure of the receiver becomes complicated and the orthogonality of the multipath signals is lost. Both problems are due to the signal being transmitted to a large number of paths. Path losses are also extensive. In the inventive solution a subset of at least one response of the antenna for at least one user at such a delay or delays is selected so that the selected at least one response of the antenna has a local energy maximum. This means that at least one horizontal vector is selected from the matrix, thus reducing the number of paths to which the signal is transmitted. The selection is based on the energy received from the different paths; the path or paths are selected from which the biggest energy is received. The algorithm can be written in a mathematical form as follows:

$$p^* = \mathrm{argmax}_p(|W_1|, \cdots, |W_L|), \tag{3}$$

where p is path; p* means the path with a local energy maximum; i is the index of the antenna element, $W_1, \ldots, W_L$ are antenna responses of various paths; each $W_i$ is $W_i = [w_{i1}, \ldots, w_{iM}]^T$, $|W_i|$ means energy of the antenna response; and L is the number of paths. The beam forming coefficients $a_1, \ldots, a_L$ for transmission are formed by calculating a complex conjugate value of the coefficients $W_1, \ldots, W_L$.

Figure 4:
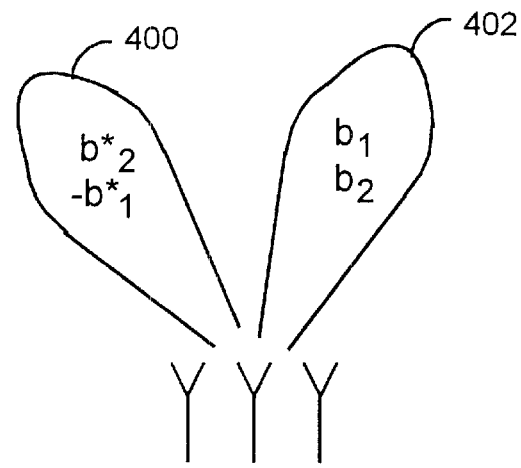
FIG. 4 shows information divided in beams by using a space time coding.

FIG. 4 shows a situation where space time coding is utilized. When space time coding is used, more than one bits or symbols can be transmitted at the same time in different beams of the antenna. Usually there are N transmit antennas and M receive antennas, where N, M=1, 2, . . . is valid for N and M. The overall channel then comprises N×M slowly varying channels. During transmission N signals (bits or symbols) are transmitted simultaneously so that each antenna element transmits one signal (bit or symbol). Each sub-channel undergoes an independent fading and the fade is assumed to be fixed during a slot and independent between slots. With two bits $b_1$ and $b_2$ to be transmitted from an antenna with two elements, the following matrix for space time coding can be formed:

$$\begin{bmatrix} b_1 & b_2 \\ b_2^* & -b_1^* \end{bmatrix}$$

The bit $b_1$ is thus transmitted in a beam 400 from a first antenna element and the bit $b_2$ is transmitted from a second antenna element in a beam 402 at the same time. At the next instant of time the bit $b_2$ is transmitted in the beam 400 and the bit $-b_1$ is transmitted in the beam 402. The space time coding is explained in more detail in V. Tarokh, H. Jafarkhani, A. R. Caldebank, "Space-time Block Coding: Theory of Generalized Orthogonal Designs," IEEE Transactions on information theory (submitted), 1998, incorporated herein as a reference.

Different bits or symbols transmitted at the same time in a similar manner as explained in FIG. 4 can also be multiplied by different orthogonal codes such as Walsh codes. At the receiver the bits received at the same time can be separated from each other by the code, as is obvious to a person skilled in the art.

Let us use FIG. 1 to describe an embodiment of the invention where the base station 100 receives and transmits by using an antenna comprising at least two elements. The base station 100 calculates an estimate of received interference power at the base station. The base station 100 transmits a signal comprising information on the transmit power and the interference power at the base station. The signal transmitted by the base station 100 can be a common downlink signal comprising information on the transmit power and the interference power at the base station. The common downlink signal can be a CPPCH-signal (Common Physical Control CHannel). The transmit power can mean the transmit power of the base station or the transmit power with which the base station desires the subscriber equipment to transmit. The subscriber equipment 106 receives the signal from the base station 100. The subscriber equipment 106 forms a channel estimate of the received signal. The subscriber equipment 106 also calculates the power and preferably also the weighting coefficients of a signal to be transmitted to the base station 100 on the basis of the information in the received signal and the channel estimate of the received signal. The signal to be transmitted to the base station can be an access signal for a call set-up, for example. The access signal generally provides for call originations, responses to pages, orders and registrations. The access signal can also comprise information on the transmit power of the signal to be transmitted to the desired beams. The subscriber equipment 106 transmits the signal to the base station 100 by using the estimated transmit power. The base station 100 receives the signal transmitted by the subscriber equipment 106 and the base station calculates the beam forming coefficients for each antenna element on the basis of the received signal by using the inventive method.

In certain cases the common downlink signal comprising the interference power at the base station comprises too inaccurate an estimate of the interference power so that the subscriber equipment cannot set its transmit power to a proper level. When the subscriber equipment is transmitting with too high or too low power a differential power control known by a person skilled in the art is used to correct the power of a subscriber equipment. If the transmit power of a subscriber equipment is too low (high) compared to the predetermined SIR (Signal Interference Ratio) the base station orders the subscriber equipment to increase (decrease) the transmit power.

According to the invention a base station, that is typically a transceiver serving a plurality of different transceivers, transmits signals for the different transceivers synchronously so that the timing of the symbols for the different transceivers is matched.

A subscriber equipment transmits information on the beam forming coefficients by which the transmitted signal is multiplied to the base station. For example four to eight bits could be enough to signal the information. By knowing the coefficients the base station can eliminate the effect of the coefficients when calculating the channel estimate. On the other hand, the subscriber equipment can also transmit a signal by using beam forming coefficients that are known to the base station (the case that no beam forming coefficients are used at all is included in this). That allows the base station to calculate the channel estimate. That operation is particularly useful when the subscriber equipment has more than one antenna elements. By helping the base station to know the channel estimate of each antenna element the quality of the transmission can be made better.

According to the invention a subscriber equipment receives the common downlink signal, forms a channel estimate and calculates the power and beam forming coefficients of a signal to be transmitted to another transceiver on the basis of the information in the received common downlink signal and the channel estimate of the received common downlink signal. The subscriber equipment then transmits the signal to the base station by using the estimated transmit power and the beam forming coefficients. The power and the beam forming coefficients are transmitted in a complex vector that can be expressed in polar form. The amplitude or the absolute value of the vector represents the power. The phase variables represent the beam forming coefficients.

In an embodiment of the invention each CDMA-base station transmits pilot signals from all antenna elements. A pilot signal comprises a spread code that is advantageously unique for each antenna element and each base station. A channel estimate for example for a common downlink is calculated by using the correlation of the pilot codes in a known manner.

Both the base station and the subscriber equipment can be implemented on one or more VLSI chips or ASICs. The inventive method can be performed by a microprocessor using a program comprising the steps of the inventive method.

Although the invention is described above with reference to an example shown in the accompanying drawings, it is apparent that the invention is not restricted to the example, but can vary in many ways within the inventive idea disclosed in the accompanying claims.

What is claimed is:

1. A method for forming a beam of a signal to be transmitted from at least one transceiver in a TDD communication system, the method comprising:

receiving and transmitting a signal by using an antenna comprising at least two elements;

receiving a multipath propagated signal from at least one different transceiver and estimating responses of the antenna at different delays for each different transceiver;

selecting a subset of at least one response of the antenna for at least one different transceiver at such a delay or delays that the selected at least one response of the antenna has a local energy maximum;

calculating beam forming coefficients for each different transceiver by using the selected subset; and multiplying the signal to be transmitted by the beam forming coefficients for each antenna element.

2. A method for forming a beam of a signal to be transmitted from at least one transceiver in a TDD communication system, the method comprising:

a base station receiving and transmitting by using an antenna comprising at least two elements;

the base station calculating an estimate of received interference power;

the base station transmitting a signal comprising information on the transmit power and the interference power at the base station;

a subscriber equipment receiving the signal, forming a channel estimate and calculating the power of a signal to be transmitted to the base station on the basis of the information in the received signal and the channel estimate of the received signal;

the subscriber equipment transmitting to the base station by using the estimated transmit power;

the base station receiving the signal transmitted by the subscriber equipment and the base station calculating beam forming coefficients for each antenna element on the basis of the received signal by estimating responses of the antenna of the received signal at different delays;

selecting a subset of at least one response of the antenna at such a delay or delays that the selected at least one response of the antenna has a local energy maximum;

calculating the beam forming coefficients by using the selected subset; and multiplying the signal to be transmitted by the beam forming coefficients for each antenna element.

3. A method for forming a beam of a signal to be transmitted from at least one transceiver in a TDD communication system in conjunction with a call set-up, the method comprising:

a base station receiving and transmitting by using an antenna comprising at least two elements;

the base station calculating an estimate of received interference power;

the base station transmitting a common downlink signal comprising information on the transmit power and the interference power at the base station;

a subscriber equipment receiving the common downlink signal, forming a channel estimate and calculating the power of an access signal to be transmitted to the base station on the basis of the information in the received common downlink signal and the channel estimate of the received common downlink signal;

the subscriber equipment transmitting the access signal to the base station by using the estimated transmit power;

the base station receiving the access signal transmitted by the subscriber equipment and the base station calculating beam forming coefficients for each antenna element on the basis of the received access signal by estimating responses of the antenna at different delays for the subscriber equipment;

selecting a subset of at least one response of the antenna at such a delay or delays that the selected at least one response of the antenna has a local energy maximum;

calculating the beam forming coefficients for each different transceiver by using the selected subset; and multiplying the signal to be transmitted by the beam forming coefficients.

4. A method as claimed in claim 1, wherein at least one beam forming coefficient is formed for each antenna element by making complex conjugates of the elemental values of the selected at least one response of the antenna.

5. A method as claimed in claim 1, wherein at least one beam forming coefficient is formed for each antenna element by making complex conjugates of the elemental values of the selected at least one response of the antenna and by multiplying the complex conjugates of the elements of the antenna response by a weight.

6. A method as claimed in claim 1, wherein the selection of at least one response of the antenna is based on information on the complexity of the receiver.

7. A method as claimed in claim 6, wherein the receiver comprises a rake receiver and the receiver informs the transmitter about the number of the rake fingers.

8. A method as claimed in claim 6, wherein the transceiver is a base station, a subscriber equipment informing the base station about the complexity of the receiver of the subscriber equipment.

9. A method as claimed in claim 2, wherein a transceiver serving a plurality of different transceivers transmits signals for the different transceivers synchronously.

10. A method as claimed in claim 3, wherein the subscriber equipment additionally transmits to the base station information on the coefficients by which the transmitted signal is multiplied.

11. A method as claimed in claim 3, wherein the subscriber equipment additionally transmits a signal by using coefficients that are known to the base station.

12. A method as claimed in claim 1, wherein the method comprises a subscriber equipment receiving the common downlink signal, forming a channel estimate and calculating the power and beam forming coefficients of a signal to be transmitted to the base station on the basis of the information in the received common downlink signal and the channel estimate of the received common downlink signal, the subscriber equipment transmitting the signal to the base station by using the estimated transmit power and the beam forming coefficients.

13. A method as claimed in claim 1, wherein the transceiver is a base station comprising an antenna with at least two elements.

14. A method as claimed in claim 1, wherein the transceiver is a subscriber equipment comprising an antenna with at least two elements.

15. A method as claimed in claim 1, wherein the signal is transmitted by using different orthogonal coding and the signal is transmitted in at least two beams at the same time and the at least two different beams have different information content.

16. A method as claimed in claim 1, wherein the signal is transmitted by using space time coding.

17. A method as claimed in claim 16, wherein space time coding is used to transmit the signal in at least two beams at the same time, the at least two different beams having different information content.

18. A method as claimed in claim 1, wherein pilot codes are transmitted from all antenna elements.

19. A method as claimed in claim 18, wherein each antenna element has a unique pilot code.

20. A method as claimed in claim 18, wherein a common downlink channel estimate is calculated by using pilot codes.

21. A method as claimed in claim 3, wherein the access signal comprises information on the transmit power of the received signal.

22. A method as claimed in claim 3, wherein the access signal comprises information on the transmit power of the signal to be transmitted.

23. A method as claimed in claim 3, wherein pilot signals are transmitted and the access signal comprises information on the transmit power of the signal to be transmitted relative to a common pilot power.

24. A method as claimed in claim 3, wherein the access signal comprises information on the transmit power of the signal to be transmitted to the desired beams.

25. An arrangement for forming a beam of a signal to be transmitted from at least one transceiver in a TDD communication system that comprises at least one base station and at least one subscriber equipment which are transceivers, a transceiver comprising an antenna with at least two elements for receiving and transmitting a signal;

the transceiver being arranged to receive a multipath propagated signal from at least one different transceiver and to estimate responses of the antenna at different delays for each different transceiver;

the transceiver being arranged to select a subset of at least one response of the antenna for at least one different transceiver at such a delay or delays that the selected at least one response of the antenna has a local energy maximum;

the transceiver being arranged to calculate beam forming coefficients for each different transceiver by using the selected subset; and the transceiver being arranged to multiply the signal to be transmitted by the beam forming coefficients for each antenna element.

26. An arrangement for forming a beam of a signal to be transmitted from at least one transceiver in a TDD communication system that comprises at least one base station and at least one subscriber equipment which are transceivers, a base station comprising an antenna with at least two elements for receiving and transmitting signals;

the base station being arranged to calculate an estimate of received interference power;

the base station being arranged to transmit a signal comprising information on the transmit power and the interference power at the base station;

a subscriber equipment being arranged to receive the signal, to form a channel estimate and to calculate the power of a signal to be transmitted to the base station on the basis of the information in the received signal and the channel estimate of the received signal;

the subscriber equipment being arranged to transmit to the base station by using the estimated transmit power;

the base station being arranged to receive the signal transmitted by the subscriber equipment and the base station being arranged to calculate the beam forming coefficients for each antenna element on the basis of the received signal so that the base station is arranged to estimate responses of the antenna of the received signal at different delays;

the base station is arranged to select a subset of at least one response of the antenna at such a delay or delays that the selected at least one response of the antenna has a local energy maximum;

the base station is arranged to calculate the beam forming coefficients by using the selected subset; and the base station is arranged to multiply the signal to be transmitted by the beam forming coefficients for each antenna element.

27. An arrangement for forming a beam of a signal to be transmitted from at least one transceiver during a call set-up in a TDD communication system that comprises at least one base station and at least one subscriber equipment which are transceivers, a base station comprising an antenna with at least two elements for receiving and transmitting;

the base station being arranged to calculate an estimate of received interference power;

the base station being arranged to transmit a common downlink signal comprising information on the transmit power and the interference power at the base station;

a subscriber equipment being arranged to receive the common downlink signal, to form a channel estimate and to calculate the power of an access signal to be transmitted to the base station on the basis of the information in the received common downlink signal and the channel estimate of the received common downlink signal;

the subscriber equipment being arranged to transmit the access signal to the base station by using the estimated transmit power;

the base station being arranged to receive the access signal transmitted by the subscriber equipment and the base station being arranged to calculate beam forming coefficients for each antenna element on the basis of the received access signal so that the base station is arranged to estimate responses of the antenna of the received signal at different delays;

the base station is arranged to select a subset of at least one response of the antenna at such a delay or delays that the selected at least one response of the antenna has a local energy maximum;

the base station is arranged to calculate the beam forming coefficients by using the selected subset; and the base station is arranged to multiply the signal to be transmitted by the beam forming coefficients for each antenna element.

28. An arrangement as claimed in claim 25, wherein the transceiver is arranged to form at least one beam forming coefficient for each antenna element by making complex conjugates of the elemental values of the selected at least one response of the antenna.

29. An arrangement as claimed in claim 25, wherein the transceiver is arranged to form at least one beam forming coefficient for each antenna element by making complex conjugates of the elemental values of the selected at least one response of the antenna and to multiply the complex conjugates of the elements of the antenna response by a weight.

30. An arrangement as claimed in claim 25, wherein the receiver of the signal to be transmitted by the transceiver is arranged to transmit information on the complexity of the receiver to the transceiver, and the transceiver is arranged to select at least one response of the antenna on the basis of the information transmitted by the receiver.

31. An arrangement as claimed in claim 30, wherein the receiver comprises a rake receiver and the receiver is arranged to inform the transmitter about the number of the rake fingers.

32. An arrangement as claimed in claim 30, wherein the transceiver is a base station, a subscriber equipment being arranged to inform the base station about the complexity of the receiver of the subscriber equipment.

33. A method as claimed in claim 26, wherein a transceiver serving plurality of different transceivers transmits synchronously signals to the different transceivers.

34. An arrangement as claimed in claim 27, wherein the subscriber equipment is additionally arranged to transmit to the base station information on the coefficients by which the transmitted signal is multiplied.

35. An arrangement as claimed in claim 27, wherein the subscriber equipment is additionally arranged to transmit a signal by using coefficients that are known to the base station.

36. An arrangement as claimed in claim 25, wherein a subscriber equipment is arranged to receive the common downlink signal, to form a channel estimate and to calculate the power and beam forming coefficients of a signal to be transmitted to the base station on the basis of the information in the received common downlink signal and the channel estimate of the received common downlink signal; and the subscriber equipment is arranged to transmit the signal to the base station by using the estimated transmit power and the beam forming coefficients.

37. An arrangement as claimed in claim 25, wherein the transceiver is a base station comprising an antenna with at least two elements.

38. An arrangement as claimed in claim 25, wherein the transceiver is a subscriber equipment comprising an antenna with at least two elements.

39. An arrangement as claimed in claim 25, wherein the transceiver is arranged to transmit the signal by using different orthogonal coding and the signal is transmitted in at least two beams at the same time, the at least two different beams having different information content.

40. An arrangement as claimed in claim 25, wherein the transceiver is arranged to transmit the signal by using space time coding.

41. An arrangement as claimed in claim 40, wherein the transceiver is arranged to use space time coding to transmit the signal in at least two beams at the same time, the at least two different beams having different information content.

42. An arrangement as claimed in claim 25, wherein the transceiver is arranged to transmit pilot codes from all antenna elements.

43. An arrangement as claimed in claim 42, wherein each antenna element has a unique pilot code.

44. An arrangement as claimed in claim 42, wherein a common downlink channel estimate is calculated by using pilot codes.

45. An arrangement as claimed in claim 27, wherein the access signal comprises information on the transmit power of the received signal.

46. An arrangement as claimed in claim 27, wherein the access signal comprises information on the transmit power of the signal to be transmitted.

47. An arrangement as claimed in claim 27, wherein the transceiver is arranged to transmit pilot signals, and the access signal comprises information on the transmit power of the signal to be transmitted relative to a common pilot power.

48. An arrangement as claimed in claim 27, wherein the access signal comprises information on the transmit power of the signal to be transmitted to the desired beams.

49. A method for forming a beam of a signal to be transmitted from at least one transceiver in a TDD communication system, the method comprising:

receiving and transmitting, by a subscriber equipment, a signal using an antenna comprising at least two elements;

receiving, by the subscriber equipment, a multipath propagated signal from at least one base station and estimating, by the subscriber equipment, responses of the antenna at different delays for each base station;

selecting, by the subscriber equipment, a subset of at least one response of the antenna for at least one base station at such a delay or delays that the selected at least one response of the antenna has a local energy maximum;

calculating, by the subscriber equipment, beam forming coefficients using the selected subset; and multiplying, by the subscriber equipment, the signal to be transmitted by the beam forming coefficients for each antenna element.

50. An arrangement for forming a beam of a signal to be transmitted from at least one transceiver in a TDD communication system that comprises at least one base station and at least one subscriber equipment which are transceivers, the subscriber equipment comprising an antenna with at least two elements for receiving and transmitting a signal;

the subscriber equipment being arranged to receive a multipath propagated signal from at least one base station and to estimate responses of the antenna at different delays for each base station;

the subscriber equipment being arranged to select a subset of at least one response of the antenna for at least one base station at such a delay or delays that the selected at least one response of the antenna has a local energy maximum;

the subscriber equipment being arranged to calculate beam forming coefficients using the selected subset; and the subscriber equipment being arranged to multiply the signal to be transmitted by the beam forming coefficients for each antenna element.

\* \* \* \* \*